United States Patent [19]

Suh et al.

[11] Patent Number: 5,579,109

[45] Date of Patent: Nov. 26, 1996

[54] 3 FREQUENCY HETERODYNE LASER INTERFEROMETER THAT DOUBLES THE RESOLUTION

[75] Inventors: Hosuhng Suh; Myungsai Chung, both of Taejon, Rep. of Korea

[73] Assignee: Korea Research Institute of Standards and Science, Taejon, Rep. of Korea

[21] Appl. No.: 303,524

[22] Filed: Sep. 9, 1994

[30] Foreign Application Priority Data

Dec. 28, 1993 [KR] Rep. of Korea ........................ 93-30360

[51] Int. Cl.$^6$ .................................................. G01B 9/02
[52] U.S. Cl. ......................... 356/349; 356/351; 356/358
[58] Field of Search ................................... 356/349, 358, 356/363, 351

[56] References Cited

U.S. PATENT DOCUMENTS

| | | | |
|---|---|---|---|
| 4,912,530 | 3/1990 | Bessho | 356/349 |
| 5,153,669 | 10/1992 | DeGroot | 356/349 |

Primary Examiner—Samuel A. Turner
Assistant Examiner—Amanda Merlino
Attorney, Agent, or Firm—Salter & Michaelson

[57] ABSTRACT

A 3-frequency heterodyne laser interferometer and a method for measuring length and other physical quantifies by using the interferometer are disclosed. The 3-frequency heterodyne laser interferometer includes; a 3-frequency laser oscillating means; a beam splitter for separating the output laser beams of the oscillating means into reference beams and comparison beams to measure the counted value of secondary beat frequencies; a polarizing beam splitter; first and second corner cubic prisms; first and second polarizer; first and second beam detectors; first and second amplifiers, first and second band pass filters; a 2-channel counter; and a length displaying means. The method for measuring lengths by using the 3-frequency heterodyne laser interferometer according to the present invention, includes the steps of; generating doppler shifts by moving the second corner cubic prism in the 3-frequency heterodyne laser interferometer; and calculating the moving distance of the second corner cubic prism based on the difference between the reference beam counted value and the counted value of the doppler shifted comparison beams, thereby doubling the resolution.

6 Claims, 2 Drawing Sheets

$f_1, f_2, f_3$ ; Frequencies of each mode ($f_1 < f_2 < f_3$).
$\perp$ and $\parallel$ represent vertical and horizontal polarization.

(Definitions of $f_1$, $f_2$, $f_3$, ⊥ and ∥ are the same as Fig. 2.)

First spectrum

Second spectrum

3 FREQUENCY HETERODYNE LASER INTERFEROMETER THAT DOUBLES THE RESOLUTION

BACKGROUND OF THE INVENTION

1. Field of the invention

The present invention relates to a laser interferometer for measuring length and other physical quantities. More specifically, the present invention relates to a 3-frequency heterodyne laser interferometer and a method for measuring lengths by using the interferometer, in which the secondary beat frequency shifts between three frequencies are measured by using a 3-frequency laser as the optical source for the heterodyne interferometer, thereby doubling the resolution.

2. Description of the Related Art

In the conventional 2-frequency heterodyne interferometer using the Zeeman stabilizing laser, a primary beat frequency between two modes (2 frequencies) is used for detecting the interfered signals. However, if a laser oscillator capable of oscillating in 3 longitudinal modes is formed, and if the three longitudinal modes of the laser are called $f_1$, $f_2$ and $f_3$ (assuming $f_3 > f_2 > f_1$), the secondary beat frequency is defined to be $|f_3 + f_1 - 2f_2|$. In view of the fact that the primary beat frequency value is defined to be $|f_1 - f_2|$ in the case of the two modes (2 frequencies), a factor 2 is added to the value of $f_2$.

The inventor found that, if a 3-frequency heterodyne interferometer is used, the resolving power is doubled in measuring physical quantifies, thereby forming a 3-frequency heterodyne laser interferometer.

Prior to the present invention, the inventor disclosed a method for stabilizing the frequency and the output of a 3-frequency laser in Korean Patent Application No. 20544/1991.

According to the present invention, the resolving power is not only doubled compared with the conventional 2-frequency heterodyne laser interferometer, but also an RF electronic device such as an RF mixer for detecting the phase shift of signals of several hundred MHz (which is the difference between the two modes) is not required. Further, the laser output becomes larger, and therefore, a multi-axis laser interferometer can be manufactured. Further, there is no lowering of the accuracy, which is caused by the feedback of the beams into the laser by being reflected from the laser interferometer.

SUMMARY OF THE INVENTION

It is an object of the present invention to provide a heterodyne laser interferometer in which the measurements of various physical quantities can be carried out in an improved manner.

It is another object of the present invention to provide a method for measuring lengths and other physical quantities by using a heterodyne laser interferometer, in which the resolution is doubled.

In achieving the above objects, the heterodyne laser interferometer according to the present invention includes: a He-Ne laser oscillating means for oscillating the laser in 3 longitudinal modes; a beam splitter for splitting the output beams of the laser oscillating means into transmissive beams and reflecting beams, for directing the reflecting beams, i.e., first beams as reference beams to a reference beam detector, and for directing the transmissive beams, i.e., second beams as comparative beams to a polarized beam splitter; a first reference beam detector for detecting the reference secondary beat frequency between the three frequencies from the reference beams; a first amplifier for amplifying the secondary beat frequency signals; a first band pass filter for selecting signals of only a certain band from among the output signals of the amplifier; a polarizing beam splitter for receiving the comparison beams to split them into two sets of spectra in accordance with the polarizing direction, and to direct a first spectrum and a second spectrum respectively to a first corner cubic prism and to a second cubic prism; the first and second cubic prisms receiving the first and second spectra from the polarizing beam splitter to reflect them back to input them into the polarizing beam splitter again; a second beam detector for detecting the secondary beat frequency of the first and second spectra outputted from the polarizing beam splitter in a synthesized form; a second amplifier and a second band pass filter connected to the output of the second beam detector in the cited order for carrying out the same function as that of the first amplifier and that of the first band pass filter; a 2-channel counter for receiving the output signals of the first and second band pass filters to count the frequencies; and a moving distance display for receiving the output of the 2-channel counter to calculate the moving distance of the movable second corner cubic prism, for carrying out the compensation of the air refraction to calculate the actual moving distance, and for displaying the moving distance.

In order to step up the detecting sensitivity for the secondary beat signals, a first polarizer and a second polarizer can be installed between the beam splitter and the first beam detector, and between the polarized beam splitter and the second beam detector respectively.

In the present invention, there is provided one laser oscillator for generating 3 frequencies, but a plurality of laser oscillators having each 1 or 2 frequencies can be used in combination.

According to another aspect of the present invention, the method for measuring lengths by using the 3-frequency heterodyne laser interferometer includes the steps of: generating doppler shifts by moving the second corner cubic prism in the 3-frequency heterodyne laser interferometer; and calculating the moving distance of the second corner cubic prism based on the difference between the reference beam count value and the count value of the doppler shifted comparison beams.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

The preferred embodiment of the present invention will be described in detail with reference to the attached drawings. However, the descriptions presented below are only based on one example, and therefore the preferred embodiment of the present invention will not limit the scope of the present invention.

The present invention can not only be applied to measuring lengths, but also can be applied to measuring angles, surface roughness, regular rectangularity, and flatness.

In the case of single path interferometer, the optical resolution of the conventional 2-frequency heterodyne laser interferometer is $\lambda/2$ ($\lambda$ represents the laser wave length). However, in the case of the present invention, the single path interferometer has a resolution of $\lambda/4$. In the case where such an interferometer is applied to measuring lengths, and where the conventional electronic devices are used for resolving and detecting the interference signals, the existing measurement accuracy can be doubled.

The conventional heterodyne laser interferometer uses 2 frequencies, and adopts as the optical source a laser which oscillates in two different modes. On the other hand, the heterodyne laser interferometer according to the present invention adopts as the optical source a laser having 3 modes which are adjacently rectangular each other, this being the essential difference between the conventional interferometer and the interferometer of the present invention.

Figure 1:
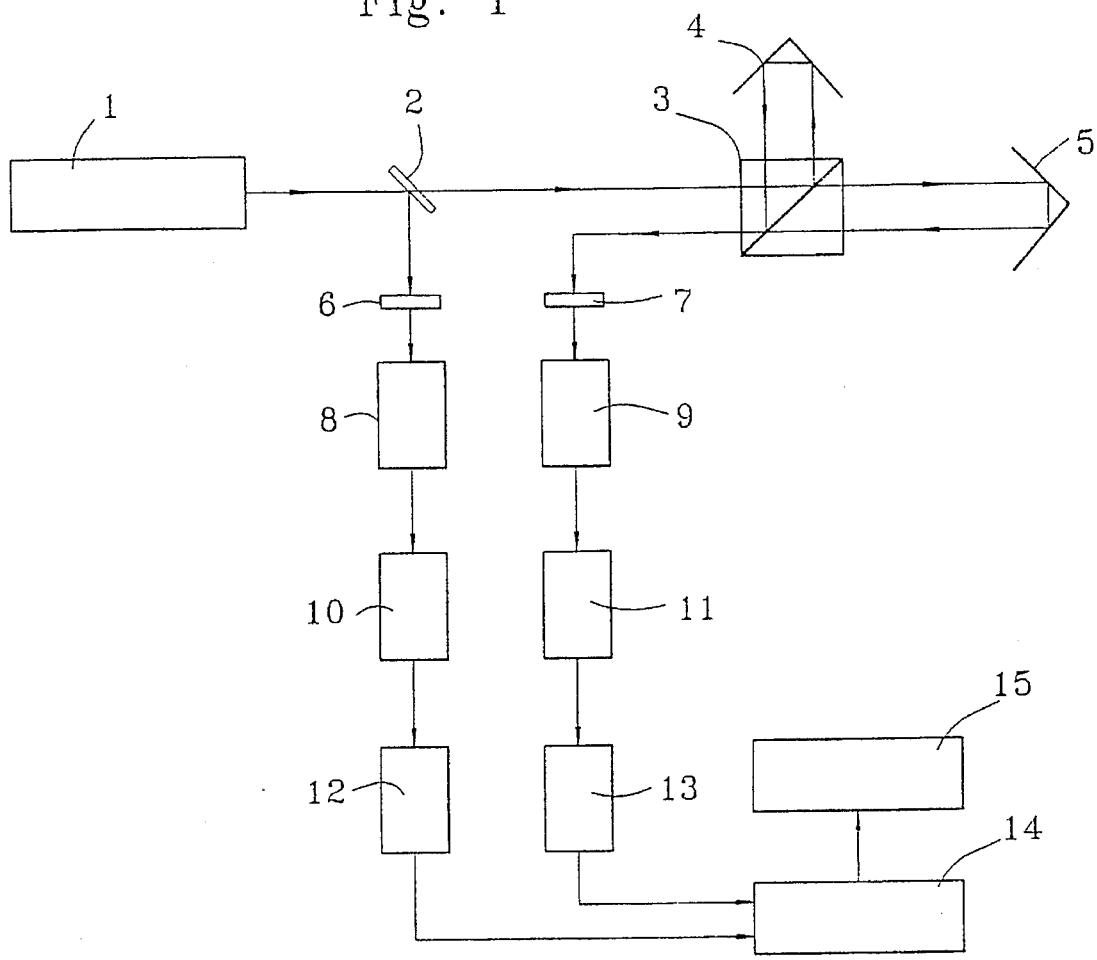
FIG. 1 is a schematic view showing the constitution of the length measuring system using the 3-frequency heterodyne laser interferometer according to the present invention.

FIG. 1 is a schematic view showing the constitution of the preferred embodiment of the 3-frequency heterodyne laser interferometer according to the present invention.

A 3-frequency laser oscillator 1 is a He-Ne laser which oscillates in 3 longitudinal modes. The three longitudinal modes are arranged in the order of: horizontal polarized beams (∥), vertical polarized beams (⊥) and horizontal polarized beams (∥), or they are arranged in the order of: vertical polarized beams (⊥), horizontal polarized beams (∥), and vertical polarized beams (⊥). The respective optical frequencies are $f_1$, $f_2$ and $f_3$, and the secondary beat frequency which is defined to be $f_b=|f_1+f_3-2f_2|$ is several hundreds KHz to several scores MHz. The length of the resonance period of the laser is automatically controlled, so that the beat frequency should be stabilized. Further, if the value of fb is to be a certain value, a polarizing beam splitter and an acoustic-optic modulator are used externally to split the beams in accordance with the polarizing direction. Then, one of the frequencies, e.g., $f_2$ or $f_1$ and $f_3$ are shifted by $f_m$ by using acoustic-optic modulator.

By using such a laser having 3 frequencies or 3 wave lengths, the heterodyne laser interferometer is formed as shown in FIG. 1.

Figure 2:
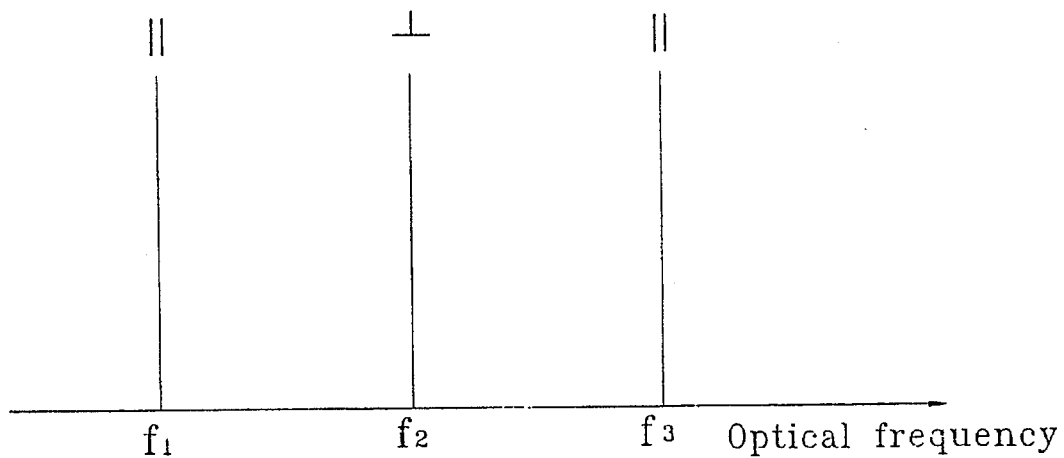
FIG. 2 illustrates a shape of the spectrum of the 3-frequency laser according to the present invention.
Figure 3:
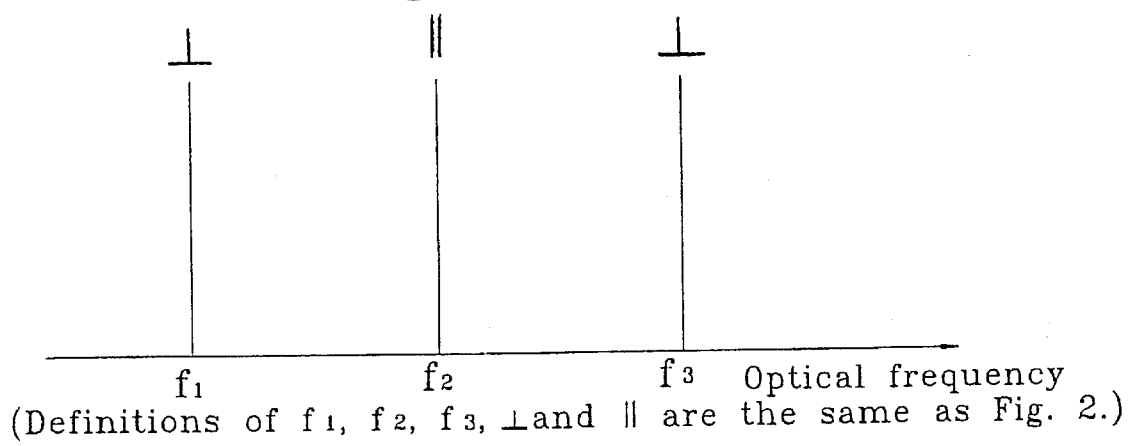
FIG. 3 illustrates another shape of the spectrum of the 3-frequency laser according to the present invention.

FIG. 2 and 3 illustrate the oscillated spectrum of the laser and the polarizing direction. The oscillated spectrum of the laser of FIG. 1 is like that of FIG. 2 or FIG. 3.

The magnitudes of the frequencies of the 3 modes are $f_1<f_2<f_3$, while the polarized beams are arranged in the order of horizontal ∥, vertical ⊥, and horizontal ∥ (FIG. 2), or in the order of vertical ⊥, horizontal ∥, and vertical ⊥ (FIG. 3).

Now descriptions will be made based on the spectrum of FIG. 2. A part of the spectra of FIG. 2, i.e., a part of the beams which have 3 frequencies, and which are outputted from the laser oscillating means 1 is reflected by the beam splitter 2. Then the reflected beams pass through a first polarizer 6, and from them, a reference secondary beat frequency $f_b(=|f_3+f_1-2f_2|)$ signals among the 3 mode frequencies is detected by a first reference beam detector 8. Under this condition, in order to improve the secondary beat signal detecting sensitivity, the first polarizer 6 is inserted. The first polarizer 6 is turned to a proper angular degree at which the signal sensitivity is maximum. The secondary beat frequency signals are made to pass through a first amplifier 10 and a band pass filter 12 having a middle frequency $f_B$ to be ultimately inputted into a reference signal input terminal of a 2-channel counter 14, thereby counting the frequencies. The counted value $C_R$ thus counted is defined as follows.

$$C_R = \int_o^t f_b \, dt \qquad (1)$$

where t represents an integrating time.

Figure 4:
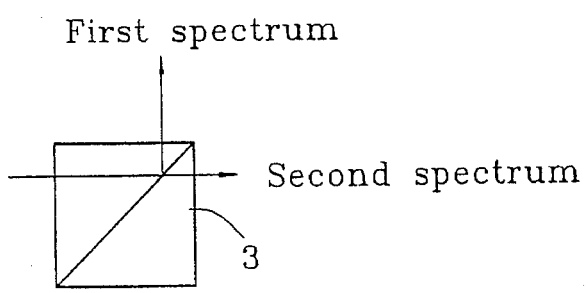
FIG. 4 illustrates the respective spectra which are splitted by the polarizing beam splitter when a spectrum is the same as that of FIG. 3.
Figure 4:
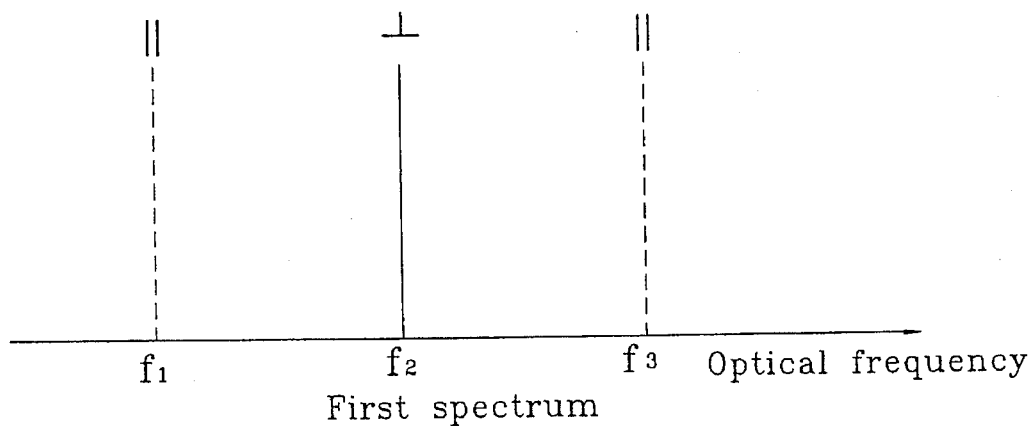
Figure 4:
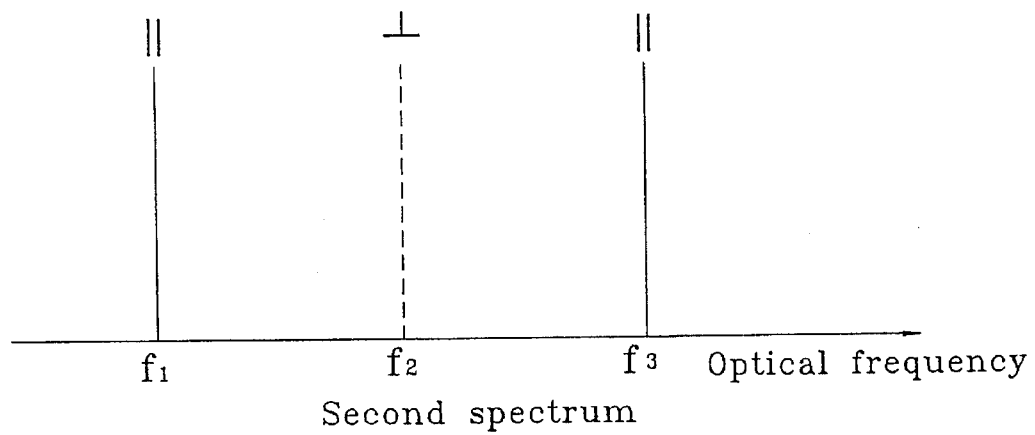

Meanwhile, the laser beams which have passed through the beam splitter 2 are separated into a first spectrum and a second spectrum of FIG. 4 by a polarizing beam splitter 3 in accordance with the polarizing direction of the 3 modes. As mentioned in the above, in the preferred embodiment of the present invention, the laser spectrum of FIG. 2 will be described. (The principle is same with the spectrum of FIG. 3.)

As shown in FIG. 1 and 4, the $f_1$ and $f_3$ frequency components of the first spectrum which has been reflected by the polarizing beam splitter 3 are inputted into a first corner cubic prism 4, and are reflected back. They are further reflected to pass through a second polarizer 7 and to be inputted into a second beam detector 9. Meanwhile, the second spectrum which has passed through polarizing beam splitter 3 includes only the $f_2$ frequency component. The laser beams of this $f_2$ frequency component are inputted into a movable second corner cubic prism 5 to be reflected back and to pass through the polarizing beam splitter 3. These beams further pass through the second polarizer 7 to be inputted into the second beam detector 9. Under this condition, the frequency components which are inputted into the detector are three in all i.e., $f_1$, $f_2$ and $f_3$, and the secondary beat frequency $f_b$ existing between them is the same as the frequency $f_b=f_3+f_1-2f_2$ which has been detected by the first beam detector 8. A second amplifier 11 and a second band pass filter 13 are connected to the output of the second beam detector 9 in the cited order for carrying out the same function as that of the first amplifier 10 and that of the first band pass filter 12. A moving distance display 15 is provided for receiving the output of the 2-channel counter 14 to calculate the moving distance of the movable second corner cubic prism, for carrying out the compensation of the air refraction to calculate the actual moving distance, and for displaying the moving distance.

If the movable second corner cubic prism 5 is moved at a velocity V toward the polarizing beam splitter, a doppler shift occurs in the frequency f2 reflected by the second corner cubic prism 5, so that the frequency $f_2$ is altered into a frequency $f_2'$ based on the following formula.

$$f_2'=f_2+\Delta f_2 \qquad (2)$$

If V is moved in the opposite direction, then a $\Delta f_2$ has a negative sign.

A $\Delta f_2$ is defined as follows.

$$\Delta f_2 = \frac{2V}{c} f_2 \qquad (3)$$

where c represents the velocity of light. Under this condition, the secondary beat frequency $f_b'$ which is detected by the second beam detector 9 is defined as follows.

$$f_b'=|f_3+f_1-2(f_2+\Delta f_2)| \qquad (4)$$

Meanwhile, in the case of $(f_3+f_1)>2(f_2+\Delta f_2)$, the following formula is established.

$$f_b' = f_b - 2\Delta f_2 \qquad (5)$$

If $f_b'$ is inputted into another input terminal of the 2-channel counter 14, the counted value $C_m$ becomes as follows.

$$C_m = \int_o^t (f_b - 2\Delta f_2) dt \qquad (6)$$

Therefore, from the two values counted by the two channels of the counter, i.e., from the difference between Formulas 1 and 6, the following formula is derived.

$$\begin{aligned} \Delta C = C_R - C_m &= \int_o^t f_b dt - \int_o^t (f_b - 2\Delta f_2) dt \\ &= \int_o^t 2\Delta f_2 \, dt \end{aligned} \qquad (7)$$

Meanwhile, in Formula 3, the velocity V is defined as follows.

$$V = \frac{\Delta F12}{2f_2} C$$

Meanwhile the moving distance S of the second corner cubic prism 5 can be calculated based on an integration of V relative to time as follows.

$$\begin{aligned} S &= \int_o^t V dt = \int_o^t \frac{c}{2f_2} \Delta f_2 \, dt \\ &= \frac{\lambda_2}{2} \int_{o]}^t \Delta f_2 \, dt \end{aligned} \qquad (8)$$

where $\lambda_2 = c/f_2$ which is the vacuum wave length of the frequency $f_2$.

If Formula 8 is compared with Formula 7, then it becomes as follows.

$$S = \frac{\lambda_2}{2} \cdot \frac{1}{2} \Delta C \qquad (9)$$

While is, in the 2-frequency heterodyne interferometer, the moving distance S becomes as follows.

$$S = \frac{\lambda_2}{2} \int_o^t \Delta f_2 \, dt = \frac{\lambda_2}{2} \Delta C \qquad (10)$$

Compared to this, S of Formula 9 has a factor ½.

From the above formulas, it can be confirmed that the resolution of the 3-frequency heterodyne laser interferometer according to the present invention is doubled compared with the conventional 2-frequency heterodyne laser interferometer. That is, if the secondary beat signals are utilized, the optical resolution is doubled compared with the case of using the primary beat signals of the conventional 2-frequency heterodyne laser interferometer. When the beat signals are counted by means of an electronic instrument, if the resolution of $\Delta C$ is assumed to be 1, then the resolution of the 2-frequency heterodyne interferometer is $\lambda/2$ (where $\lambda$ is the adopted wave length, and in the case of 633 nm He-Ne laser, $\lambda/2 \approx 316$ nm), while the resolution of the 3-frequency laser interferometer according to the present invention becomes $\lambda/4$.

The present invention was described based on the preferred embodiment, but it is apparent that various modifications and changes can be added without departing from the scope of the present invention. Therefore, such modifications and changes should come within the scope of the present invention based on the appended claims.

What is claimed is:

1. A 3-frequency heterodyne laser interferometer comprising:

a He-Ne laser oscillating means for oscillating a laser in 3 longitudinal modes;

a beam splitter for splitting the output beams of the laser oscillating means into transmissive beams and reflecting beams, for directing the reflecting beams, i.e., first beams as reference beams to a first reference beam detector, and for directing the transmissive beams, i.e., second beams as comparison beams to a polarizing beam splitter;

said first reference beam detector for detecting a reference secondary beat frequency between the three frequencies from the reference beams;

a first amplifier for amplifying the reference secondary beat frequency signals;

a first band pass filter for selecting signals of only a certain band from among the output signals of said first amplifier;

a polarizing beam splitter for receiving the comparison beams to split them into two sets of spectra in accordance with the polarizing direction, and to direct a first spectrum and a second spectrum respectively to a first corner cubic prism and to a second corner cubic prism;

said first and second cubic prisms for receiving the first and second spectra from said beam splitter to reflect them back and to input them again into said polarizing beam splitter;

a second reference beam detector for detecting the reference secondary beat frequency of the first and second spectra outputted from said polarizing beam splitter in a synthesized form;

a second amplifier and a second band pass filter connected to the output of said second reference beam detector in the cited order for carrying out the same function as that of said first amplifier and that of said first band pass filter;

a 2-channel counter for receiving the output signals of said first and second band pass filters to count the frequencies; and a moving distance display for receiving the output of the 2-channel counter to calculate the moving distance of said second corner cubic prism, for carrying out the compensation of the air refraction to calculate the actual moving distance, and for displaying the moving distance.

2. The 3-frequency heterodyne laser interferometer as claimed in claim 1, wherein said laser oscillating means oscillates a 3-frequency He-Ne laser.

3. The 3-frequency heterodyne laser interferometer as claimed in claim 1, wherein said laser oscillating means is composed of a plurality of laser oscillating means having 1 or 2 frequencies, thereby producing 3 frequencies.

4. The 3-frequency heterodyne laser interferometer as claimed in claim 1, wherein a first polarizer is installed between said beam splitter and said first beam detector and a second polarizer is installed between said polarizing beam splitter and said second beam detector so as to improve the reference secondary beat signal detecting sensitivity.

5. A method for measuring lengths comprising the steps of:

oscillating 3 frequencies having different polarizing directions from each other in the adjacent ones by means of a 3-frequency oscillating means so as to generate reference beams and comparison beams;

detecting a reference secondary beat frequency from the reference beams and a reference secondary beat frequency from the comparison beams;

moving a second corner cubic prism at a certain speed as much as the distance to be measured, so as to generate a doppler shift in the comparison beams before they are detected;

counting the value of the secondary beat frequency of the comparison beams and the value of the frequency of the reference beams;

calculating by means of a 2-channel counter the difference between the counted value of the secondary beat frequency of the comparison beams having the doppler shift, and the counted value of the frequency of reference beams; and displaying the moving distance of said second corner cubic prism on a length displaying device, whereby the resolution for measuring the length is doubled.

6. The method as claimed in claim 5, wherein the three longitudinal modes of said laser beams oscillated by said oscillating means are arranged in the order of horizontal polarized beams (∥), vertical polarized beams (⊥), and horizontal polarized beams (∥), or in the order of vertical polarized beams (⊥), horizontal polarized beams (∥), and vertical polarized beams (⊥).

* * * * *